United States Patent
Mizuhara (10) Patent No.: US 8,330,837 B2
(45) Date of Patent: Dec. 11, 2012

(54) ELECTRONIC CAMERA WHICH CLAMPS IMAGE SIGNAL OUTPUTTED ROM IMAGER

(75) Inventor: Yoshifumi Mizuhara, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 187 days.

(21) Appl. No.: 12/842,328

(22) Filed: Jul. 23, 2010

(65) Prior Publication Data

US 2011/0019037 A1 Jan. 27, 2011

(30) Foreign Application Priority Data

Jul. 24, 2009 (JP) ................................. 2009-172913

(51) Int. Cl.
*H04N 9/64* (2006.01)
(52) U.S. Cl. ..................................... 348/243; 348/222.1
(58) Field of Classification Search ............... 348/222.1, 348/241, 243
See application file for complete search history.

(56) References Cited

U.S. PATENT DOCUMENTS

| | | | | |
|---|---|---|---|---|
| 6,005,615 A | * | 12/1999 | Tsuda | 348/243 |
| 6,278,490 B1 | * | 8/2001 | Fukuda et al. | 348/362 |
| 7,081,921 B2 | * | 7/2006 | Nitta et al. | 348/229.1 |
| 2006/0237629 A1 | * | 10/2006 | Oda | 250/208.1 |
| 2007/0216778 A1 | * | 9/2007 | Hatani et al. | 348/222.1 |
| 2008/0197268 A1 | | 8/2008 | Kameda | |
| 2009/0026571 A1 | | 1/2009 | Inagaki et al. | |

FOREIGN PATENT DOCUMENTS

| | | |
|---|---|---|
| JP | 2007027845 | 2/2007 |
| JP | 2007104463 | 4/2007 |
| JP | 2008118293 | 5/2008 |
| JP | 2008205905 | 9/2008 |
| JP | 2009032950 | 2/2009 |
| JP | 2009033550 | 2/2009 |

* cited by examiner

*Primary Examiner* — Gevell Selby
(74) *Attorney, Agent, or Firm* — Novak Druce + Quigg LLP (57) ABSTRACT

An electronic camera includes an imager. An imager outputs an image signal that is based on electric charges produced on an imaging surface having an optical black area. A clamper clamps the image signal outputted from the imager by referring to a signal level of the optical black area. A processor processes the image signal outputted from the clamper by referring to a parameter setting. A restrictor restricts behavior of the clamper corresponding to a specific area allocated to the optical black area. An adjustor adjusts the parameter setting based on an output of the clamper corresponding to the restricting process of the restrictor.

5 Claims, 7 Drawing Sheets

(A) EFFECTIVE PIXEL AREA (B) BYPASS AREA

ELECTRONIC CAMERA WHICH CLAMPS IMAGE SIGNAL OUTPUTTED ROM IMAGER

CROSS REFERENCE OF RELATED APPLICATION

The disclosure of Japanese Patent Application No. 2009-172913, which was filed on Jul. 24, 2009, is incorporated herein by reference.

BACKGROUND OF THE INVENTION

1. Field of the Invention

The present invention relates to an electronic camera. More particularly, the present invention relates to an electronic camera which adjusts a reference level of an image signal representing an object scene.

2. Description of the Related Art

According to one example of this type of camera, an imaging surface of a CCD imager has: an optical black area and a dummy area, each of which corresponds to a black image; and an effective pixel area corresponding to an object scene image. Furthermore, the optical black area and the dummy area are adjacent to each other in a raster scanning direction. Moreover, amounts of dark current generated on the imaging surface decrease in the order of the optical black area, the effective pixel area, and the dummy area. A clamp circuit clamps a raw image signal based on electric charges produced on the imaging surface of the CCD imager at a timing to stride over the optical black area and the dummy area in the raster scanning direction. The raw image signal clamped in this way is subsequently subjected to processes, such as color separation, white balance adjustment, and YUV conversion, in a signal processing circuit.

However, in the above-described camera, setting of the signal processing circuit is not adjusted according to the amount of the dark current generated on the imaging surface, and thus, there is a limit to the improvement of quality of an image signal.

SUMMARY OF THE INVENTION

An electronic camera according to the present invention, comprises: an imager which outputs an image signal that is based on electric charges produced on an imaging surface having an optical black area; a clamper which clamps the image signal outputted from the imager by referring to a signal level of the optical black area; a processor which processes the image signal outputted from the clamper by referring to a parameter setting; a restrictor which restricts behavior of the clamper corresponding to a specific area allocated to the optical black area; and an adjustor which adjusts the parameter setting based on an output of the clamper corresponding to the restricting process of the restrictor.

An electronic camera according to the present invention, comprises: an imager which outputs an image signal that is based on electric charges produced on an imaging surface having an optical black area; a clamper which clamps the image signal outputted from the imager by referring to a signal level of the optical black area; a processor which processes the image signal outputted from the clamper by referring to a parameter setting; a fetcher which fetches an image signal that is not yet clamped by the clamper, corresponding to the optical black area; and an adjustor which adjusts the parameter setting based on the image signal fetched by the fetcher.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
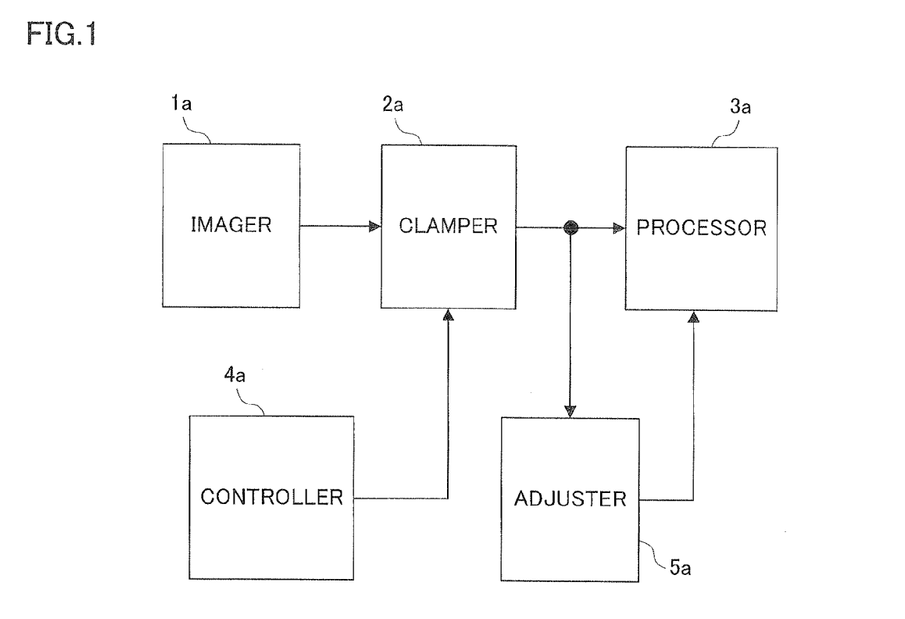
FIG. 1 is a block diagram showing one example of a basic configuration of one embodiment of the present invention.

With reference to FIG. 1, an electronic camera according to one embodiment of the present invention is basically configured as follows: An imager 1a outputs an image signal that is based on electric charges produced on an imaging surface having an optical black area. A clamper 2a clamps the image signal outputted from the imager 1a by referring to a signal level of the optical black area. A processor 3a processes the image signal outputted from the clamper 2a by referring to a parameter setting. A restrictor 4a restricts behavior of the clamper 2a corresponding to a specific area allocated to the optical black area. An adjustor 5a adjusts the parameter setting based on an output of the clamper 2a corresponding to the restricting process of the restrictor 4a.

Therefore, the parameter setting referred to for processing the image signal is adjusted based on an optical black component acquired in a state where the behavior of the clamper is restricted. Thereby, an adjustment accuracy of the parameter setting, as well as a quality of the image signal, is improved.

Figure 2:
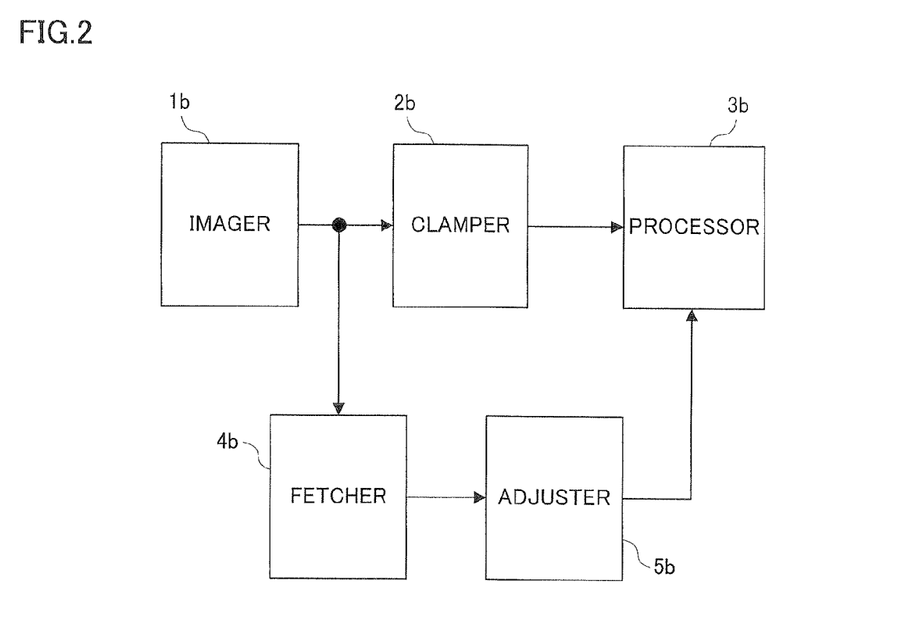
FIG. 2 is a block diagram showing another example of the basic configuration of one embodiment of the present invention.

With reference to FIG. 2, the electronic camera according to one embodiment of the present invention is also basically configured as follows: An imager 1b outputs an image signal that is based on electric charges produced on an imaging surface having an optical black area. A clamper 2b clamps the image signal outputted from the imager 1b by referring to a signal level of the optical black area. A processor 3b processes the image signal outputted from the clamper 2b by referring to a parameter setting. A fetcher 4b fetches an image signal that is not yet clamped by the clamper 2b, corresponding to the optical black area. An adjustor 5b adjusts a parameter setting based on the image signal fetched by the fetcher 4b.

Therefore, the parameter setting referred to for processing the image signal is adjusted based on an optical black component of an image signal that is not yet clamped. Thereby, the adjustment accuracy of the parameter setting, as well as the quality of the image signal, is improved.

Figure 3:
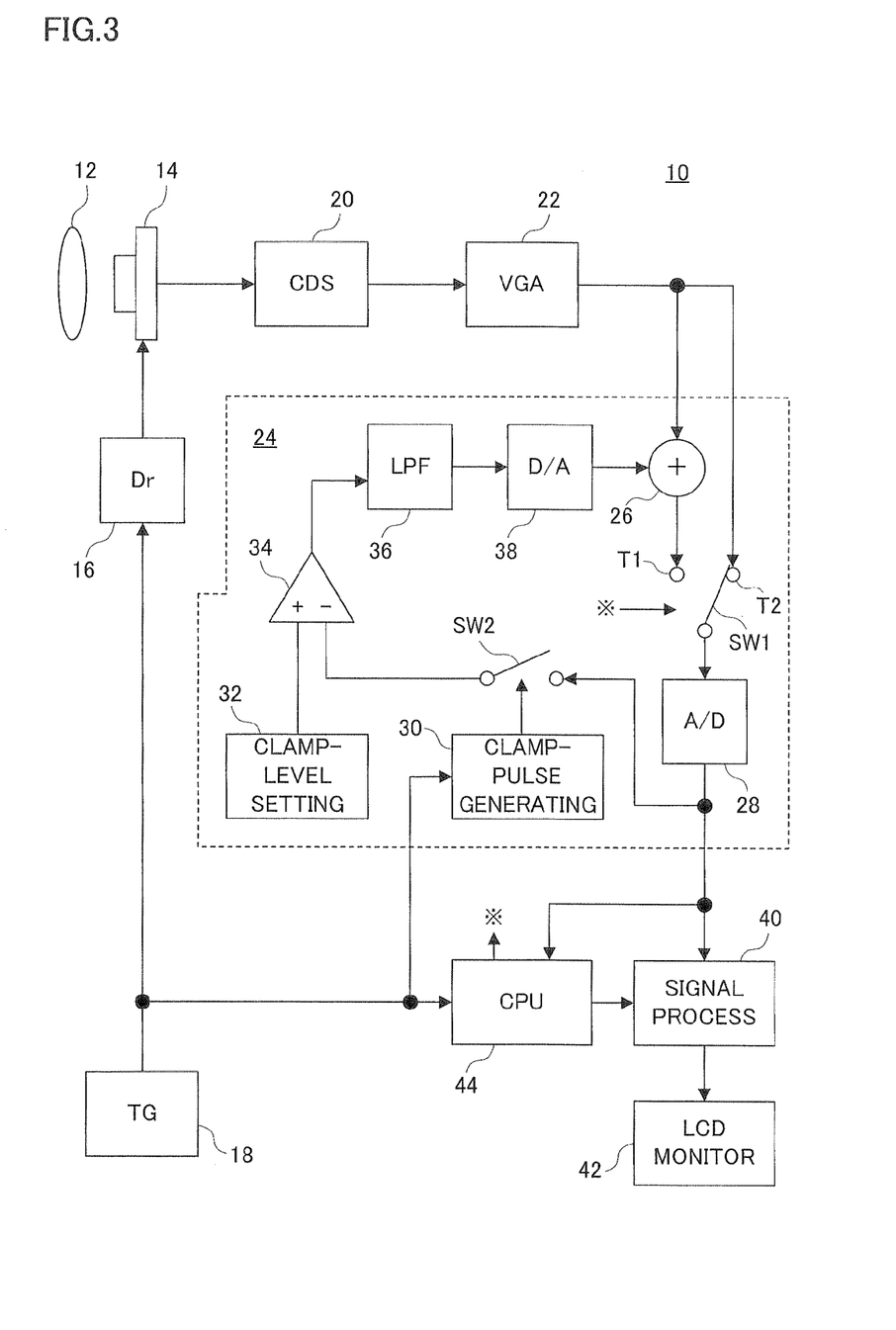
FIG. 3 is a block diagram showing a configuration of one embodiment of the present invention.

With reference to FIG. 3, a digital camera 10 according to this embodiment includes an optical lens 12. An optical image of an object scene enters, with irradiation, an imaging surface of a CCD imager 14 via the optical lens 12. Because of an optical property, the optical image entering, with irradiation, the imaging surface is reversed along an up-and-down direction.

In response to timing signals such as a vertical synchronization signal Vsync outputted from a TG (Timing Generator) 18, a driver 16 exposes the imaging surface of the CCD imager 14 and reads out electric charges produced by the exposure. The CCD imager 14 is of an interlace scanning. The electric charges produced on the imaging surface are read out from the CCD imager 14 while being divided into a plurality of fields.

Figure 4:
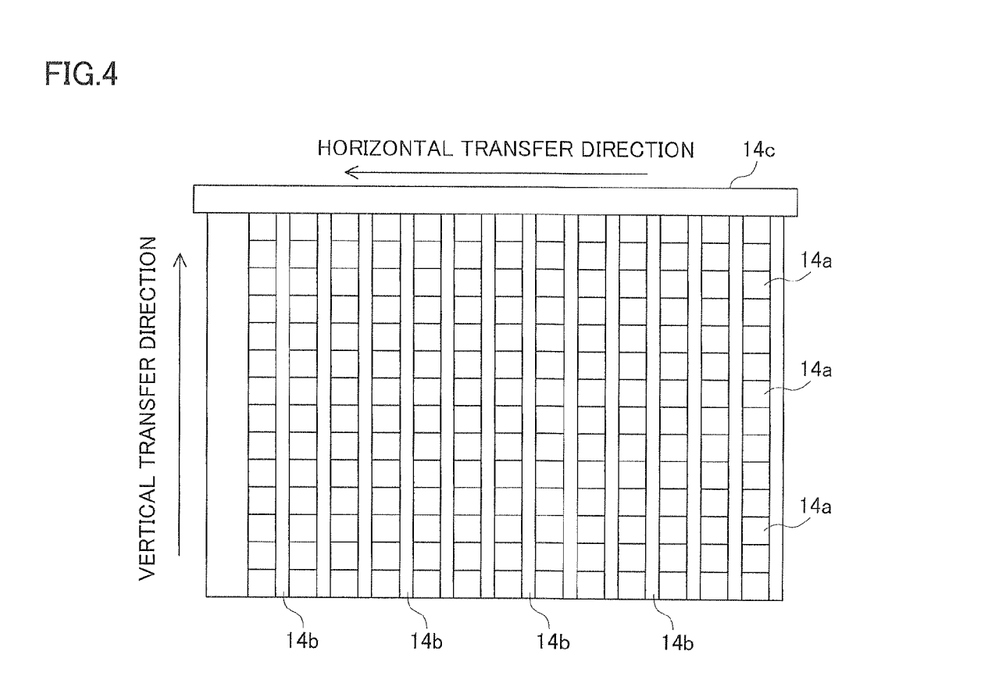
FIG. 4 is an illustrative view showing one example of a configuration of a CCD imager applied to the embodiment in FIG. 3.

With reference to FIG. 4, the CCD imager 14 has a plurality of light receiving elements 14a, 14a, . . . , arrayed planarly on the imaging surface, a plurality of vertical transfer registers 14b, 14b, . . . , respectively allocated to a plurality of light receiving element columns, and a horizontal transfer register 14c arranged at a terminal end of the plurality of vertical transfer registers 14b, 14b, . . . .

Figure 5:
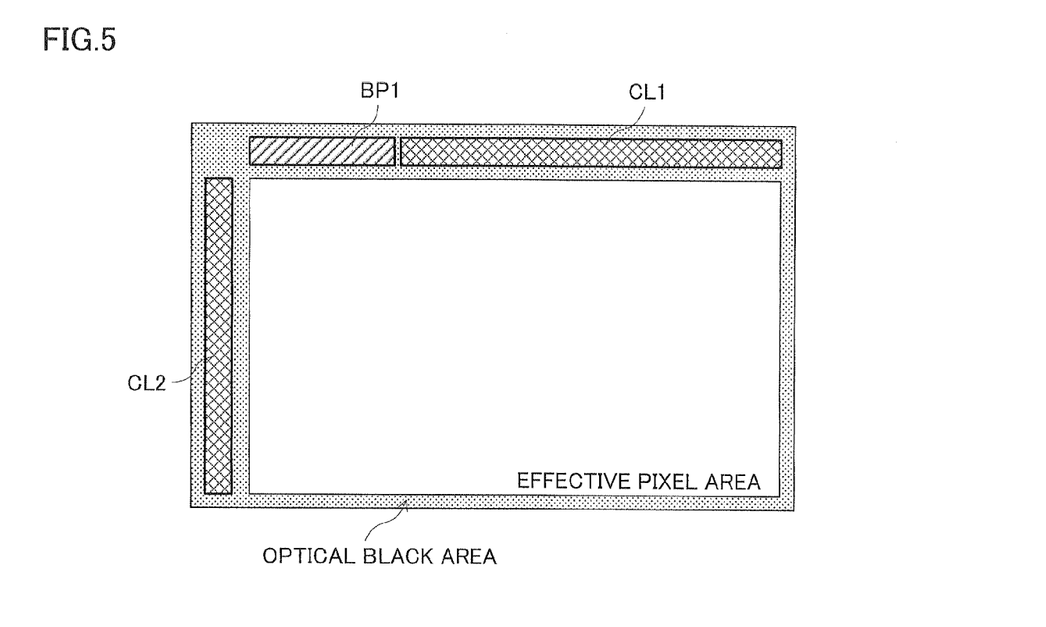
FIG. 5 is an illustrative view showing one example of an allocation state of an effective pixel area, an optical black area, a clamp area, and a bypass area on the imaging surface.

As shown in FIG. 5, the imaging surface has an effective pixel area and an optical black area. The effective pixel area is surrounded by the optical black area. Moreover, the light receiving elements 14a, 14a, . . . and the vertical transfer registers 14b, 14b, . . . , shown in FIG. 4 are formed in both the effective pixel area and the optical black area.

It is noted that the light receiving elements 14a, 14a, . . . on the effective pixel area are exposed in order to receive the optical image of the object scene while the light receiving elements 14a, 14a, . . . on the optical black area are covered with a light-shielding material not shown. Therefore, it is possible to define the effective pixel area as an "object scene image area" and the optical black area as a "black image area".

To the optical black area, clamp areas CL1 and CL2 and a bypass area BP1 are allocated. The clamp area CL1 has a laterally-long small rectangular shape and is allocated to an upper right side portion of the imaging surface. The clamp area CL2 has a vertically-long small rectangular shape and is allocated to a left side portion of the imaging surface. The bypass area BP1 has a laterally-long small rectangular shape and is allocated to an upper left side portion of the imaging surface.

The electric charges produced in each light receiving element 14a are read out to the vertical transfer register 14b, and transferred toward the horizontal transfer register 14c. The electric charges that reach the horizontal transfer register 14c undergo a sensor gate not shown, and then, are outputted as a raw image signal. In the outputted raw image signal, a component equivalent to a dark current generated in the vertical transfer register 14b is included.

Returning to FIG. 3, the raw image signal outputted from the CCD imager 14 is subjected to correlation double sampling and gain adjustment in a Correlation Double Sampling (CDS) circuit 20 and a Variable Gain Amplifier (VGA) 22. From the VGA 22 to a clamp circuit 24, the raw image signal having an appropriate gain is applied.

In the clamp circuit 24, the raw image signal is applied to a terminal T1 via an adder 26, and is also applied directly to a terminal T2. The adder 26 adds an offset signal outputted from a D/A converter 38 to the raw image signal outputted from the VGA 22. Therefore, a raw image signal that is not yet clamped is applied to the terminal T2, and on the other hand, a previously clamped raw image signal is applied to the terminal T1.

A CPU 44 connects a switch SW1 to the terminal T2 in a period corresponding to the bypass area BP1, and connects the switch SW1 to the terminal T1 in a period corresponding to an area other than the bypass area BP1. Therefore, from the switch SW1, the raw image signal that is not yet clamped is outputted corresponding to the bypass area BP1, and the previously clamped raw image signal is outputted corresponding to the area other than the bypass area BP1.

An A/D converter 28 converts a format of the raw image signal outputted from the switch SW1 from an analog format into a digital format. In the A/D converter 28, at the same time as the analog signal is converted into the digital signal, a clip process is executed. A clip level falls from a predetermined clamp level by a predetermined value, and the raw image signal outputted from the A/D converter 28 has a data value equal to or more than the clip level.

A clamp-pulse generating circuit 30 generates a clamp pulse based on the timing signal outputted from the TG 18. The clamp pulse reaches a high level corresponding to the clamp areas CL1 and CL2, and reaches a low level corresponding to the area other than the clamp areas CL1 and CL2. A switch SW2 is turned on in a period during which the clamp pulse exhibits the high level, and is turned off in a period during which the clamp pulse exhibits the low level. Therefore, from the switch SW2, the raw image signal corresponding to the clamp areas CL1 and CL2, i.e., a black image signal, is outputted.

The black image signal outputted from the switch SW2 is applied to a minus input terminal of a computing unit 34. On the other hand, a clamp-level setting circuit 32 applies the clamp level signal to a plus input terminal of the computing unit 34. The clamp level signal has a data value equivalent to a predetermined clamp level. The computing unit 34 subtracts the black image signal from such a clamp level signal, and outputs the resultant subtraction signal toward an LPF 36.

The LPF 36 smoothes the subtraction signal from the computing unit 34 so as to produce the offset signal. A format of the produced offset signal is converted by the D/A converter 38 from a digital format into an analog format. The adder 26 adds the produced offset signal to the raw image signal from the VGA 22.

A signal processing circuit 40 performs processes, such as noise reduction, white balance adjustment, color separation, and YUV conversion, on the raw image signal outputted from the A/D converter 28. The image signal outputted from the signal processing circuit 40 is applied to an LCD monitor 42, and as a result, a moving image representing the object scene is displayed on a monitor screen.

Figure 6:
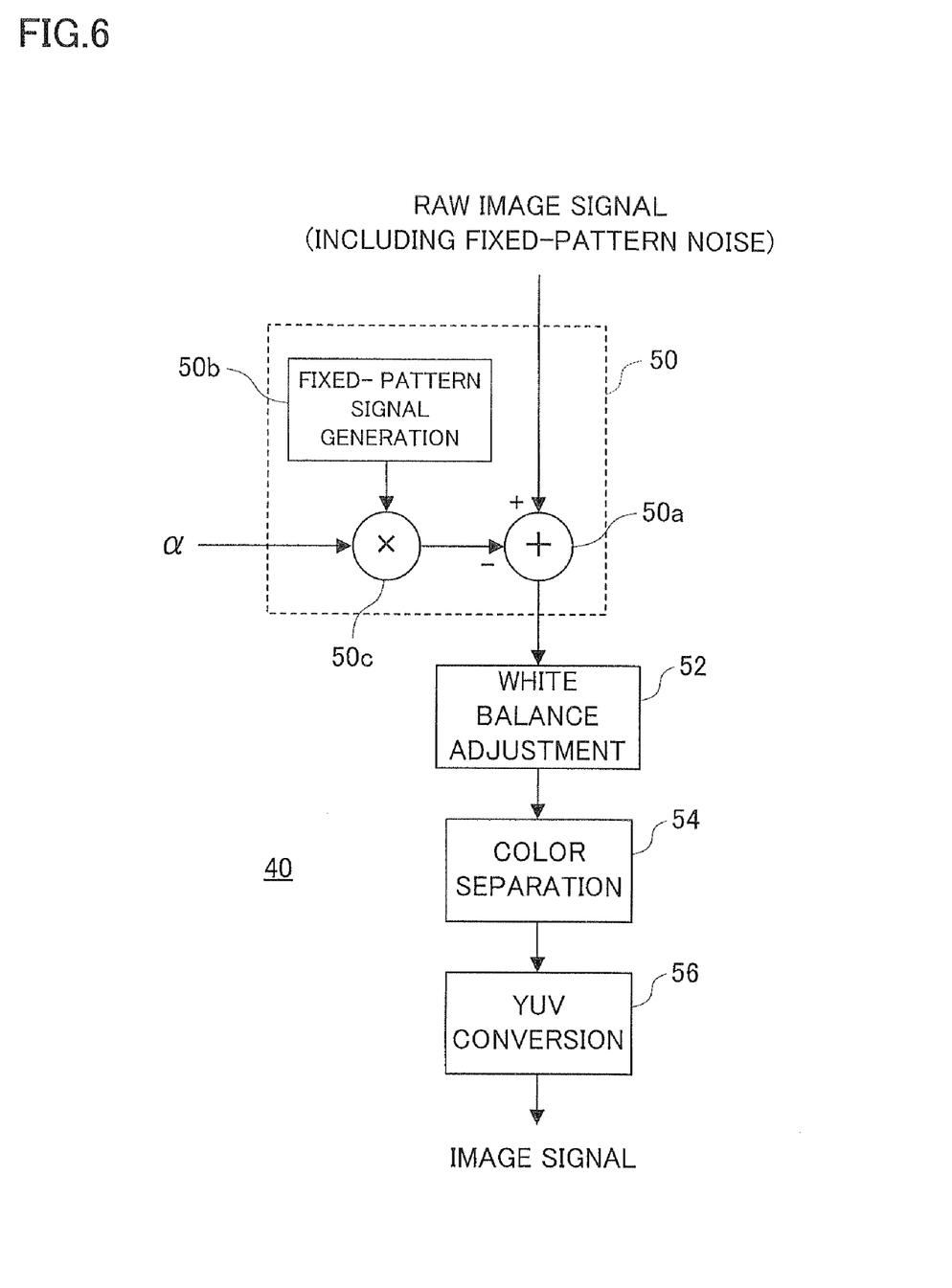
FIG. 6 is a block diagram showing one portion of a configuration of a signal processing circuit applied to the embodiment in FIG. 3.

The signal processing circuit 40 is configured as shown in FIG. 6. The raw image signal outputted from the A/D converter 28 is applied to a plus terminal of an adder 50a arranged in a noise-reduction circuit 50. A fixed-pattern-signal generating circuit 50b generates a fixed-pattern signal, and a multiplier 50c multiplies the generated fixed-pattern signal by a gain $\alpha$. The fixed-pattern signal to which the gain a is imparted is applied to a minus terminal of the adder 50a. As a result, a fixed-pattern noise superposed on the raw image signal is reduced.

A white-balance adjusting circuit 52 adjusts a white balance of the raw image signal outputted from the adder 50a, and a color separation circuit 54 performs a color separation process on the raw image signal having the adjusted white balance. A YUV conversion circuit 56 converts a format of an image signal outputted from the color separation circuit 54, into a YUV format, and outputs the converted image signal.

Figure 7:
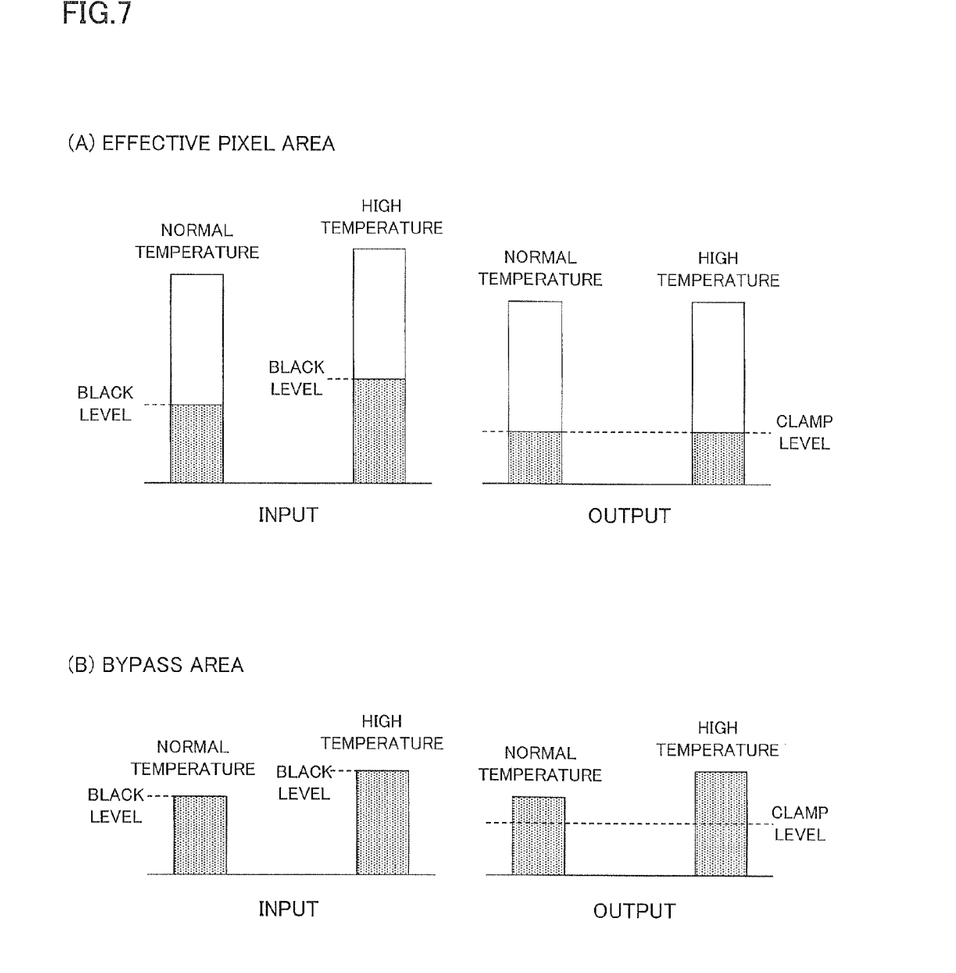
FIG. 7(A) is an illustrative view showing one example of clamp behavior corresponding to the effective pixel area.
FIG. 7(B) is an illustrative view showing one example of the clamp behavior corresponding to the bypass area.

As a result of the clamp circuit 24 operating as described above, a level of the raw image signal corresponding to the effective pixel area, i.e., a level of the object-scene-image signal, is changed as shown in FIG. 7(A), and a level of the raw image signal corresponding to the bypass area BP1, i.e., a level of the black image signal, is changed as shown in FIG. 7(B).

An amplitude of the black level depends on the amount of dark current and the amount of dark current increases as a temperature rises. Thus, the black level increases as the temperature rises in both FIG. 7(A) and FIG. 7(B). However, the clamp behavior is permitted in the effective pixel area, while it is restricted in the bypass area. Thus, the black level of the object-scene-image signal is adjusted to the above-described predetermined clamp level, and on the other hand, the level of the black image signal varies depending on the temperature.

The CPU 44 fetches such a black image signal from the A/D converter 28, and adjusts the amplitude of the above-described gain α based on the level of the fetched black image signal. Specifically, when the black level is less than a threshold value TH1, the gain α is set to an initial value. When the black level is equal to or more than the threshold value TH1 and less than a threshold value TH2 (TH2>TH1), the gain a is set to "initial value+K" (K>0).

By taking notice of the black image signal outputted from the A/D converter 28 in a state that the clamp behavior is restricted (i.e., the black image signal that is not yet clamped), it is possible to correctly determine the black level, and as well as to improve a performance of the noise reduction process.

It is noted that when the black level becomes equal to or more than the threshold value TH2, a power source is forcedly turned off. Thereby, it becomes possible to avoid an instance in which an abnormal image is displayed on the LCD monitor 42.

Figure 8:
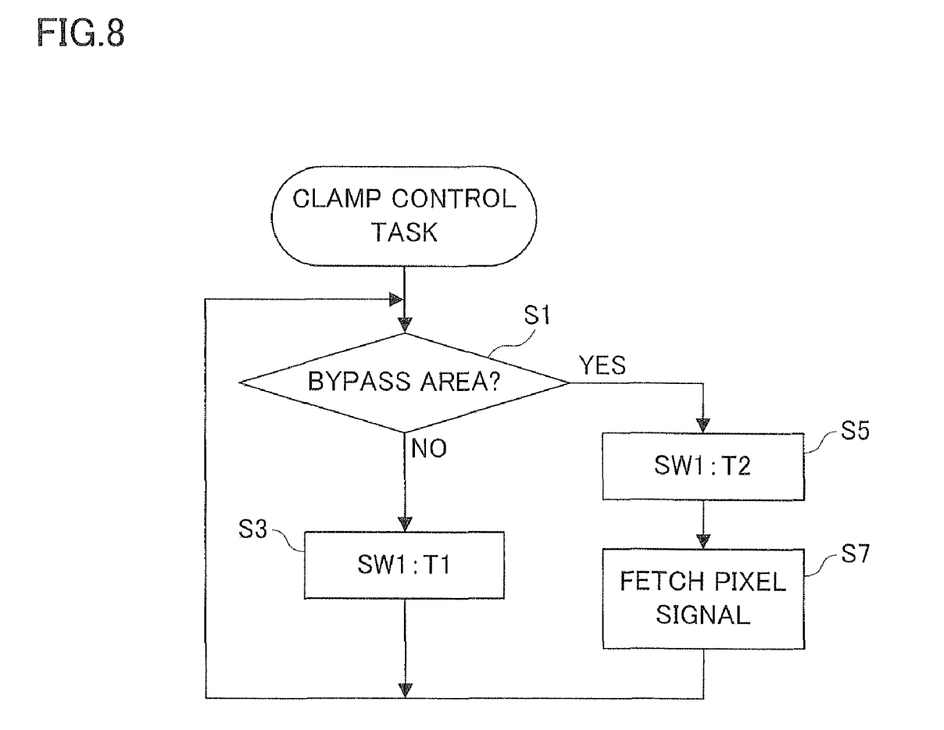
FIG. 8 is a flowchart showing one portion of the behavior of a CPU applied to the embodiment in FIG. 3.
Figure 9:
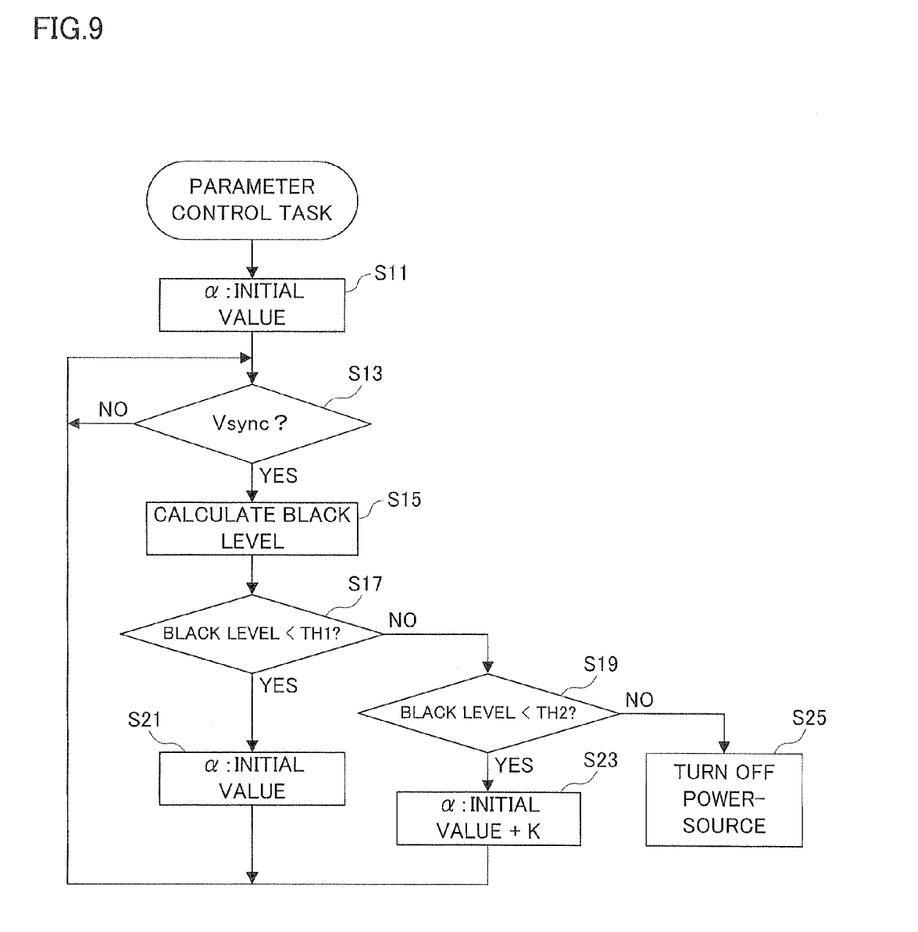
FIG. 9 is a flowchart showing another portion of the behavior of the CPU applied to the embodiment in FIG. 3.

The CPU 44 executes a plurality of tasks including a clamp control task shown in FIG. 8 and a parameter control task shown in FIG. 9, in a parallel manner. It is noted that control programs corresponding to these tasks are stored in a flash memory not shown.

With reference to FIG. 8, in a step S1, it is determined based on the output of the TG 18 whether or not a current pixel signal outputted from the VGA 22 is a pixel signal belonging to the bypass area BP1. When a determined result is NO, the switch SW1 is set to the terminal T1 in a step S3. Thereafter, the process returns to the step S1. When the determined result is YES, the switch SW1 is set to the terminal T2 in a step S5. In a step S7, the pixel signal of the current pixel is fetched from the A/D converter 28. Thereafter, the process returns to the step S1.

With reference to FIG. 9, in a step S11, the gain a is set to the initial value, and it is determined in a step S13 whether or not the vertical synchronization signal Vsync is generated. When the determined result is updated from NO to YES, the process advances to a step S15 so as to calculate the black level based on the pixel signal fetched by the step-S7 process corresponding to a previous field. In a step S17, the calculated black level is compared with the threshold value TH1. In a step S19, the calculated black level is compared with the threshold value TH2.

When the black level is less than the threshold value TH1, YES is determined in the step S17, and the gain α is set to the initial value in a step S21. When the black level is equal to or more than the threshold value TH1 and less than the threshold value TH2, YES is determined in a step S19, and the gain α is set to "initial value+K" (K>0) in a step S23. Upon completion of the process in the step S21 or S23, the process returns to the step S13. When the black level is equal to or more than the threshold value TH2, the power source is turned off in a step S25.

As can be seen from the above-described explanation, the CCD imager 14 outputs the raw image signal based on the electric charges produced on the imaging surface having the optical black area. The clamp circuit 24 clamps the raw image signal outputted from the CCD imager 14 by referring to the signal level of the optical black area. The signal processing circuit 40 reduces the fixed-pattern noise superposed on the raw image signal outputted from the clamp circuit 24 by referring to the fixed-pattern signal to which the gain α is imparted. The CPU 44 restricts the behavior of the clamp circuit 24 corresponding to the bypass area BP1 allocated to the optical black area (S1 to S5), and adjusts the amplitude of the gain α based on the output of the clamp circuit 24 corresponding to this restricting process (S7, S11 to S23).

Therefore, the amplitude of the gain α referred to in order to reduce the fixed-pattern noise is adjusted based on the optical black component acquired in a state where the behavior of the clamp circuit 24 is restricted. Thereby, the adjustment accuracy of the amplitude of the gain α, as well as the quality of the image signal, is improved.

It is noted that although in this embodiment the CCD-type imager is adopted, a CMOS-type imager may be optionally adopted instead thereof. In this case, one of the clamp areas CL1 and CL2 may be optionally omitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager which outputs an image signal that is based on electric charges produced on an imaging surface having an optical black area;
    a clamper which clamps the image signal outputted from said imager by referring to a signal level of the optical black area;
    a reducer which reduces a noise superposed the image signal outputted from said clamper by referring to a reference pattern;
    a restrictor which restricts behavior of said clamper corresponding to a specific area allocated to the optical black area; and
    an adjustor which adjusts the a gain of the reference pattern based on an output of said clamper corresponding to the restricting process of said restrictor.

2. An electronic camera according to claim 1, further comprising a power-source controller which turns off a power source when an output level of said clamper corresponding to the restricting process of said restrictor is equal to or more than a predetermined value.

3. An electronic camera according to claim 1, wherein said restrictor includes a selector which selects one of an image signal that is not yet clamped and a previously clamped image signal, and a selection controller which controls the selection behavior of said selector.

4. An electronic camera, comprising:
    an imager which outputs an image signal that is based on electric charges produced on an imaging surface having an optical black area;

a clamper which clamps the image signal outputted from said imager by referring to a signal level of the optical black area;

a reducer which reduces a noise superposed on the image signal outputted from said clamper by referring to a reference pattern; and an adjustor which adjusts the a gain of the reference pattern based on partial image signal corresponding to the optical black area and being not yet clamped by said clamper.

5. An electronic camera according to claim 4, wherein said adjuster includes an acquirer which acquires an image signal that is not yet clamped by said clamper, corresponding to the optical black area, and an adjusting processor which executes a gain adjusting process based on the image signal acquired by said acquirer.

* * * * *